United States Patent
Chavez Munoz et al.

(10) Patent No.: US 12,384,319 B1
(45) Date of Patent: Aug. 12, 2025

(54) STEERING-WHEEL ASSEMBLY WITH AIRBAG

(71) Applicant: Ford Global Technologies, LLC, Dearborn, MI (US)

(72) Inventors: Diego Enrique Chavez Munoz, West Bloomfield, MI (US); Kathryn Megan Kosinski, Royal Oak, MI (US); Nathan Kenneth Shaeff, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/907,893

(22) Filed: Oct. 7, 2024

(51) Int. Cl.
  *B60R 21/203* (2006.01)
  *B62D 1/04* (2006.01)

(52) U.S. Cl.
  CPC ...... *B60R 21/2037* (2013.01); *B60R 21/2035* (2013.01); *B62D 1/046* (2013.01)

(58) Field of Classification Search
  CPC .............. B60R 21/203; B60R 21/2035; B60R 21/2037; B62D 1/04; B62D 1/046; B62D 1/11; B60Q 5/003
  See application file for complete search history.

(56) References Cited

U.S. PATENT DOCUMENTS

| | | | |
|---|---|---|---|
| 4,899,020 A * | 2/1990 | Ohno | H05K 1/0353 174/258 |
| 6,474,682 B2 * | 11/2002 | Ikeda | B60Q 5/003 200/61.55 |
| 6,942,247 B2 | 9/2005 | Simpson | |
| 7,114,745 B2 | 10/2006 | Schutz et al. | |
| 7,694,997 B2 * | 4/2010 | Burghardt | B60R 21/2037 280/743.1 |
| 8,336,911 B2 * | 12/2012 | Hondier | B60Q 5/003 280/731 |
| 8,342,567 B2 * | 1/2013 | Sasaki | B60Q 5/003 200/61.55 |
| 8,419,052 B2 | 4/2013 | Yamaji et al. | |
| 9,731,747 B2 * | 8/2017 | Obayashi | B60R 21/2037 |
| 10,099,641 B2 | 10/2018 | Eireos Garcia | |
| 11,130,462 B2 | 9/2021 | Schutz | |

(Continued)

FOREIGN PATENT DOCUMENTS

| | | |
|---|---|---|
| DE | 102005021786 B4 | 10/2013 |
| KR | 20140018110 A | 2/2014 |

*Primary Examiner* — Laura Freedman
(74) *Attorney, Agent, or Firm* — Frank A. MacKenzie; Brooks Kushman P.C.

(57) ABSTRACT

A steering-wheel assembly includes a steering-wheel base including a plurality of catches, a horn electrical circuit extending along the steering-wheel base and electrically connected to a vehicle horn, and an airbag assembly including a plurality of hooks arranged to engage with respective ones of the catches. The horn electrical circuit includes a plurality of gaps across the respective ones of the catches. Each hook includes an electrical connector positioned to close the respective gap when the hook is fully engaged with the respective catch and to leave the respective gap open when the hook is disengaged from the respective catch. The horn electrical circuit is closable to activate the vehicle horn when the electrical connectors close the gaps. The horn electrical circuit is open when at least one of the electrical connectors is not closing the respective gap.

17 Claims, 8 Drawing Sheets

(56) References Cited

U.S. PATENT DOCUMENTS 11,142,156 B2 10/2021 Kolosick
2006/0028001 A1* 2/2006 Heil .................. B60Q 5/003
　　　　　　　　　　　　　　　　　　280/731

* cited by examiner

STEERING-WHEEL ASSEMBLY WITH AIRBAG

BACKGROUND

Vehicles are equipped with airbags. In the event of certain impacts, one or more inflators activates and provides inflation medium to one or more of the airbags, and the airbags pressurize and control the kinematics of occupants. The airbags are located at various positions in passenger compartments of vehicles. Vehicles typically include a driver airbag mounted in the steering wheel, a passenger airbag mounted in the dashboard on the other side of the vehicle from the driver airbag, and side curtain airbags mounted above the side windows.

DETAILED DESCRIPTION

Figure 1:
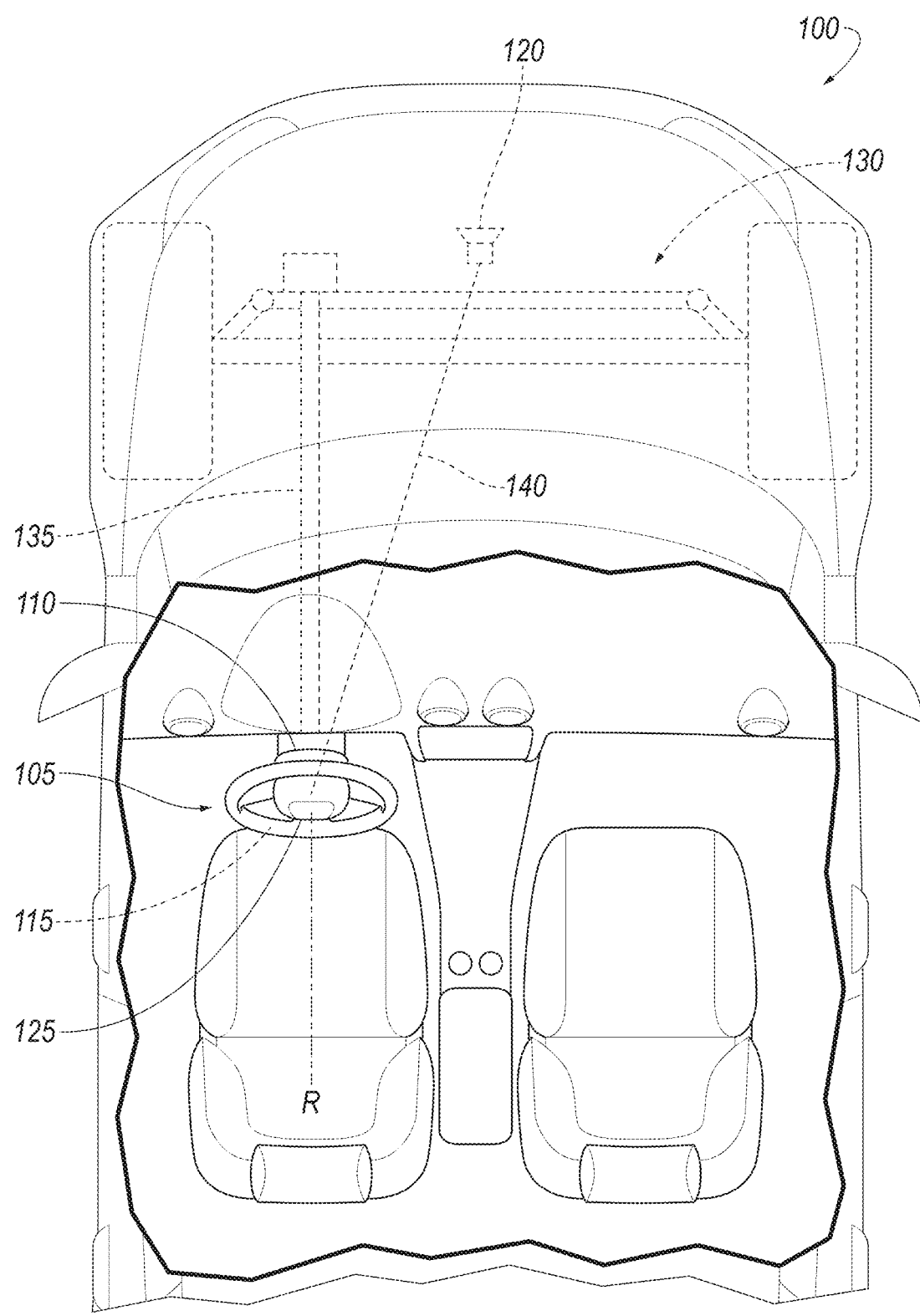
FIG. 1 is a top diagrammatic view of an example vehicle including an example steering-wheel assembly.

Disclosed herein is a steering-wheel assembly for a vehicle. The steering-wheel assembly includes a steering-wheel base including a plurality of catches, a horn electrical circuit extending along the steering-wheel base and electrically connected to a vehicle horn, and an airbag assembly including a plurality of hooks arranged to engage with respective ones of the catches. The horn electrical circuit includes a plurality of gaps across the respective ones of the catches. Each hook includes an electrical connector positioned to close the respective gap when the hook is fully engaged with the respective catch and to leave the respective gap open when the hook is disengaged from the respective catch. The horn electrical circuit is closable to activate the vehicle horn when the electrical connectors close the gaps. The horn electrical circuit is open when at least one of the electrical connectors is not closing the respective gap.

The design of this steering-wheel assembly aids the manufacturability of the steering-wheel assembly. When assembling the steering-wheel assembly, a technician can, upon installing the airbag assembly into the steering-wheel base, activate the horn (e.g., by pressing on the airbag assembly). The vehicle horn emitting sound indicates that all of the hooks are fully engaged with the respective catches. If the vehicle horn does not emit sound, the technician is alerted to a potential issue and can investigate whether any of the hooks are not fully engaged or whether another issue is affecting the vehicle horn or horn electrical circuit. Moreover, the design behaves in a simple, predictable manner during installation. The design does not employ multiple stages; each hook is either fully engaged, in which case the electrical connector closes the respective gap and permits the vehicle horn to operate, or not fully engaged, in which case the gap is open and the vehicle horn will not emit sound.

A steering-wheel assembly includes a steering-wheel base including a plurality of catches, a horn electrical circuit extending along the steering-wheel base and electrically connected to a vehicle horn, and an airbag assembly including a plurality of hooks arranged to engage with respective ones of the catches. The horn electrical circuit includes a plurality of gaps across the respective ones of the catches. Each hook includes an electrical connector positioned to close the respective gap when the hook is fully engaged with the respective catch and to leave the respective gap open when the hook is disengaged from the respective catch. The horn electrical circuit is closable to activate the vehicle horn when the electrical connectors close the gaps. The horn electrical circuit is open when at least one of the electrical connectors is not closing the respective gap.

In an example, the electrical connectors may be metal plates each extending across respective exterior surfaces of the respective hooks. In a further example, each hook may include an underside surface facing toward a frame portion of the airbag assembly, the underside surfaces may contact the respective catches when the respective hooks are fully engaged, and the electrical connectors may be positioned on the respective underside surfaces. In a yet further example, each catch may include a contact surface that contacts the respective underside surface when the respective hook is fully engaged, and the contact surfaces may be nonconductive.

In an example, the gaps may be arranged in series with each other in the horn electrical circuit.

In an example, each gap may include a first wire terminal end and a second wire terminal end spaced from the first wire terminal end, and the respective electrical connector may contact the first wire terminal end and the second wire terminal end of the respective gap when the respective hook is fully engaged.

In an example, the horn electrical circuit may include an electrical switch closable by pressing an exterior shell of the airbag assembly toward the steering-wheel base. In a further example, the steering-wheel assembly may further include a spring biasing the exterior shell of the airbag assembly away from the steering-wheel base at the electrical switch.

In another further example, the airbag assembly may include a frame portion and the exterior shell, and the hooks are rigidly connected to the frame portion.

In another further example, the electrical switch may be arranged in series with the gaps in the horn electrical circuit.

In another further example, the horn electrical circuit may include a plurality of electrical switches including the electrical switch, each electrical switch closable by pressing the exterior shell toward the steering-wheel base. In a yet further example, the electrical switches may be arranged in parallel with each other in the horn electrical circuit. In a still yet further example, the parallel arrangement of the electrical switches may be arranged in series with the gaps in the horn electrical circuit.

In an example, the hooks may be elongated parallel to each other. In a further example, the hooks may define respective axes of elongation, each hook may include an underside surface facing toward a frame portion of the airbag assembly along the respective axis of elongation, and the underside surfaces may contact the respective catches when the respective hooks are fully engaged. In a yet further example, the electrical connectors may be positioned on the respective underside surfaces.

In an example, the airbag assembly may include an airbag cushion and an inflator positioned to inflate the airbag cushion.

With reference to the Figures, wherein like numerals indicate like parts throughout the several views, a steering-wheel assembly 105 includes a steering-wheel base 110 including a plurality of catches 410, a horn electrical circuit 115 extending along the steering-wheel base 110 and electrically connected to a vehicle horn 120, and an airbag assembly 125 including a plurality of hooks 340 arranged to engage with respective ones of the catches 410. The horn electrical circuit 115 includes a plurality of gaps 415 across the respective ones of the catches 410. Each hook 340 includes an electrical connector 505 positioned to close the respective gap 415 when the hook 340 is fully engaged with the respective catch 410 and to leave the respective gap 415 open when the hook 340 is disengaged from the respective catch 410. The horn electrical circuit 115 is closable to activate the vehicle horn 120 when the horn electrical connectors 505 close the gaps 415. The horn electrical circuit 115 is open when at least one of the electrical connectors 505 is not closing the respective gap 415.

With reference to FIG. 1, a vehicle 100 includes the steering-wheel assembly 105. The vehicle 100 may be any passenger or commercial automobile such as a car, a truck, a sport utility vehicle, a crossover, a van, a minivan, a taxi, a bus, etc.

The vehicle 100 includes the vehicle horn 120. The vehicle horn 120 is a sound-making device that generally makes a "honk" or "beep" sound directed externally from the vehicle 100. An operator of the vehicle 100 may use the horn to indicate to other road users that the vehicle 100 is present or notify other road users of some circumstance. The vehicle horn 120 may be located in a front end of the vehicle 100. The vehicle horn 120 may be spaced from the steering-wheel assembly 105.

The vehicle 100 includes a steering system 130. The steering system 130 is typically a conventional vehicle steering subsystem and controls the turning of the wheels. The steering system 130 may be a rack-and-pinion system with electric power-assisted steering, a steer-by-wire system, as both are known, or any other suitable system. A human operator may control the steering system 130 via the steering-wheel assembly 105.

The vehicle 100 (e.g., the steering system 130) includes the steering-wheel assembly 105. The steering-wheel assembly 105 includes the steering-wheel base 110 and the airbag assembly 125. The steering-wheel base 110 is fixed to a steering column 135 of the steering system 130, and rotation of the steering-wheel base 110 thereby rotates the steering column 135 and turns the wheels of the vehicle 100. The airbag assembly 125 clips onto the steering-wheel base 110, as will be described in more detail below. Once the airbag assembly 125 is attached to the steering-wheel base 110 during assembly, the steering-wheel base 110 and the airbag assembly 125 rotate together as a unit about an axis of rotation R defined by the steering column 135.

The horn electrical circuit 115 extends along the steering-wheel base 110, as will be described in more detail below. The position of the horn electrical circuit 115 allows an operator of the vehicle 100 to easily actuate the vehicle horn 120. The horn electrical circuit 115 is electrically connected to the vehicle horn 120. For example, the horn electrical circuit 115 may be electrically connected to the vehicle horn 120 by wiring 140 extending from the steering-wheel base 110 to the vehicle horn 120.

Figure 2:
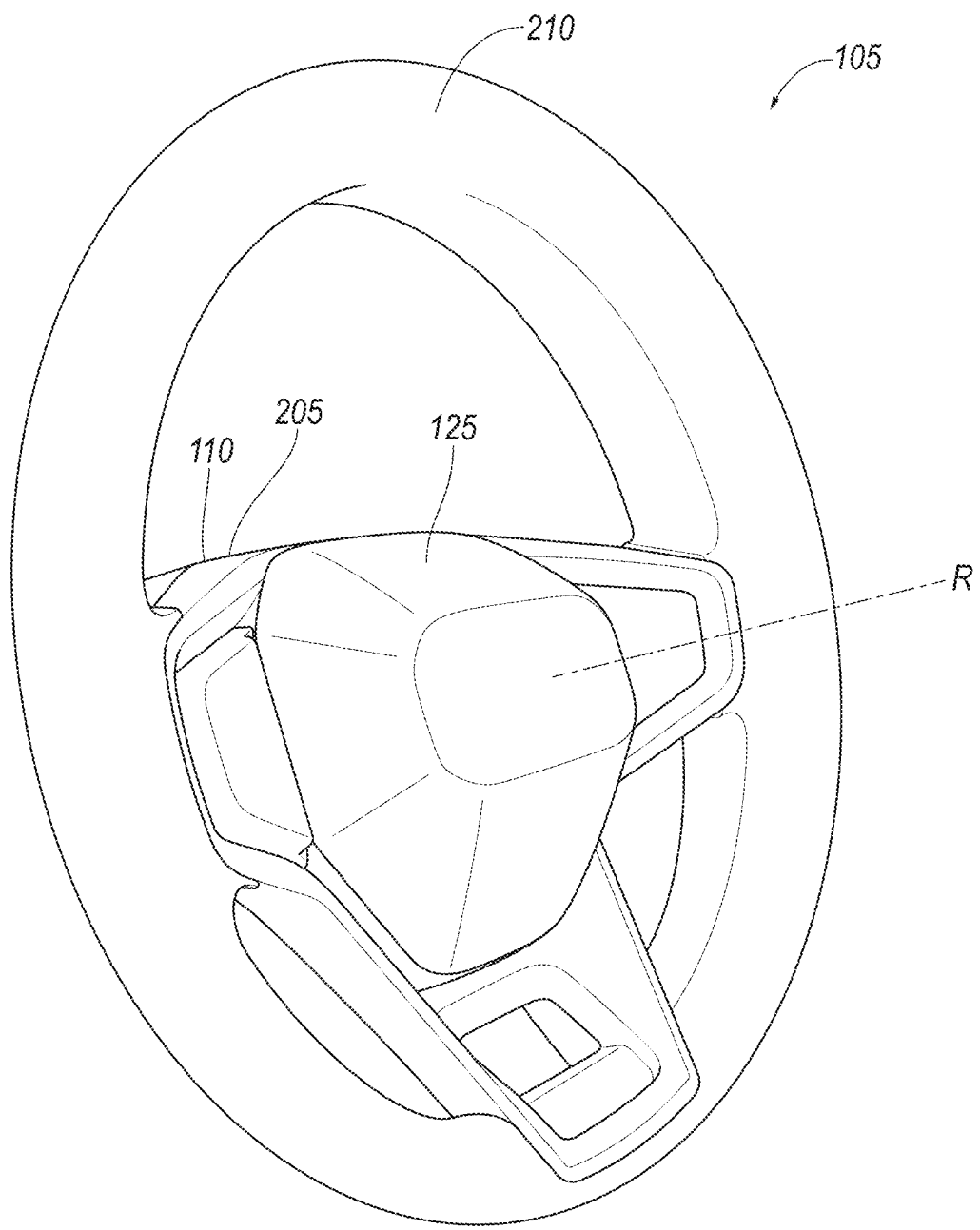
FIG. 2 is a side perspective view of the steering-wheel assembly.

With reference to FIG. 2, the steering-wheel assembly 105 includes the steering-wheel base 110 and the airbag assembly 125. The steering-wheel base 110 includes a hub 205 and a ring 210 extending circumferentially around the hub 205. The hub 205 may connect to the steering column 135 (shown in FIG. 1). The ring 210 may be fixedly attached to the hub 205. The ring 210 may have a generally toroidal shape that is graspable by the operator to turn the steering-wheel assembly 105 about the axis of rotation R.

The airbag assembly 125 may clip onto a rearward side of the steering-wheel base 110 (i.e., a side of the steering-wheel base 110 facing toward the operator). The airbag assembly 125 may clip onto the hub 205 of the steering-wheel assembly 105. The airbag assembly 125 may present a finished surface toward the operator.

Figure 3:
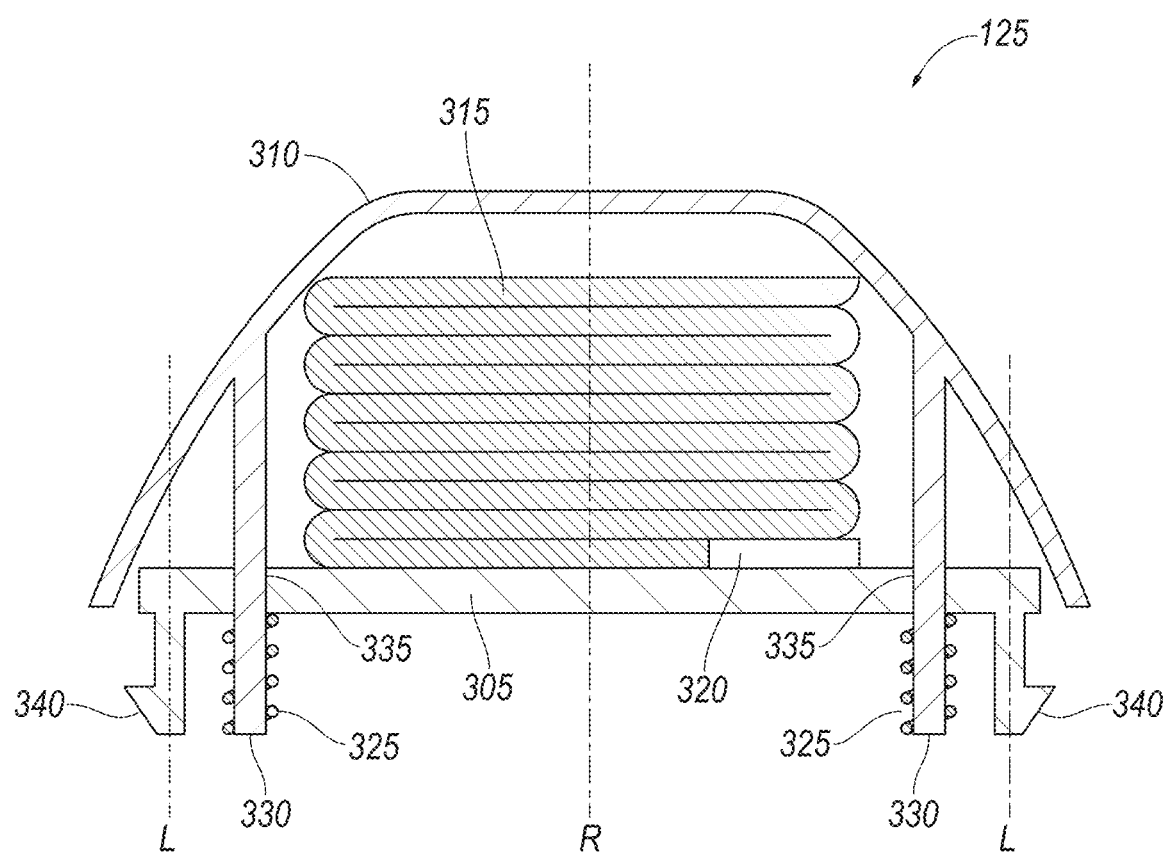
FIG. 3 is a top diagrammatic cross-sectional view of an airbag assembly of the steering-wheel assembly.

With reference to FIG. 3, the airbag assembly 125 may include a frame portion 305, an exterior shell 310, an airbag cushion 315, an inflator 320, springs 325, and the hooks 340.

The frame portion 305 may serve as a base or platform for mounting the airbag cushion 315 and the inflator 320. Once the airbag assembly 125 is installed, the frame portion 305 may be fixed relative to the steering-wheel base 110 (shown in FIG. 2). The frame portion 305 provides a surface facing rearward, against which the airbag cushion 315 can push during inflation in order to inflate in a rearward direction (i.e., toward the operator).

The airbag cushion 315 is inflatable from an uninflated position to an inflated position. The airbag cushion 315 in the uninflated position may be enclosed between the frame portion 305 and the exterior shell 310. The airbag cushion 315 in the uninflated position may be folded and resting on the frame portion 305. The airbag cushion 315 may be formed of any suitable airbag material, for example, a woven polymer. For example, the airbag cushion 315 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The inflator 320 is positioned to inflate the airbag cushion 315. The inflator 320 is fluidly connected to the airbag cushion 315. The inflator 320 may be mounted to the frame portion 305. Upon receiving a signal from, for example, a vehicle controller, the inflator 320 may inflate the airbag cushion 315 with an inflation medium, such as a gas. The inflator 320 may be, for example, a pyrotechnic inflator that uses a chemical reaction to drive inflation medium to the airbag cushion 315. The inflator 320 may be of any suitable type, for example, a cold-gas inflator.

The exterior shell 310 extends around and covers the airbag cushion 315 in the uninflated position. The exterior shell 310 may include seams or the like (not shown) that open when the airbag cushion 315 presses against an interior of the exterior shell 310 during inflation. The exterior shell 310 may present a finished exterior surface to the operator, and the operator may activate the vehicle horn 120 by pressing the exterior surface of the exterior shell 310 toward the steering-wheel base 110 (i.e., in a vehicle-forward direction), as described below. The exterior shell 310 may be movable along an axis within a range of motion toward and away from the frame portion 305 (e.g., along the axis of rotation R).

The exterior shell 310 may include pegs 330 positioned in corresponding holes 335 of the frame portion 305. The exterior shell 310 may move within the range of motion via the pegs 330 sliding within the holes 335. The positioning of the pegs 330 within the holes 335 may restrict the motion of the exterior shell 310 relative to the frame portion 305 in directions other than along the axis (e.g., the axis of rotation R). The pegs 330 may be positioned to press on respective electrical switches 405 in order to activate the vehicle horn 120 (described below with respect to FIG. 4).

Figure 4:
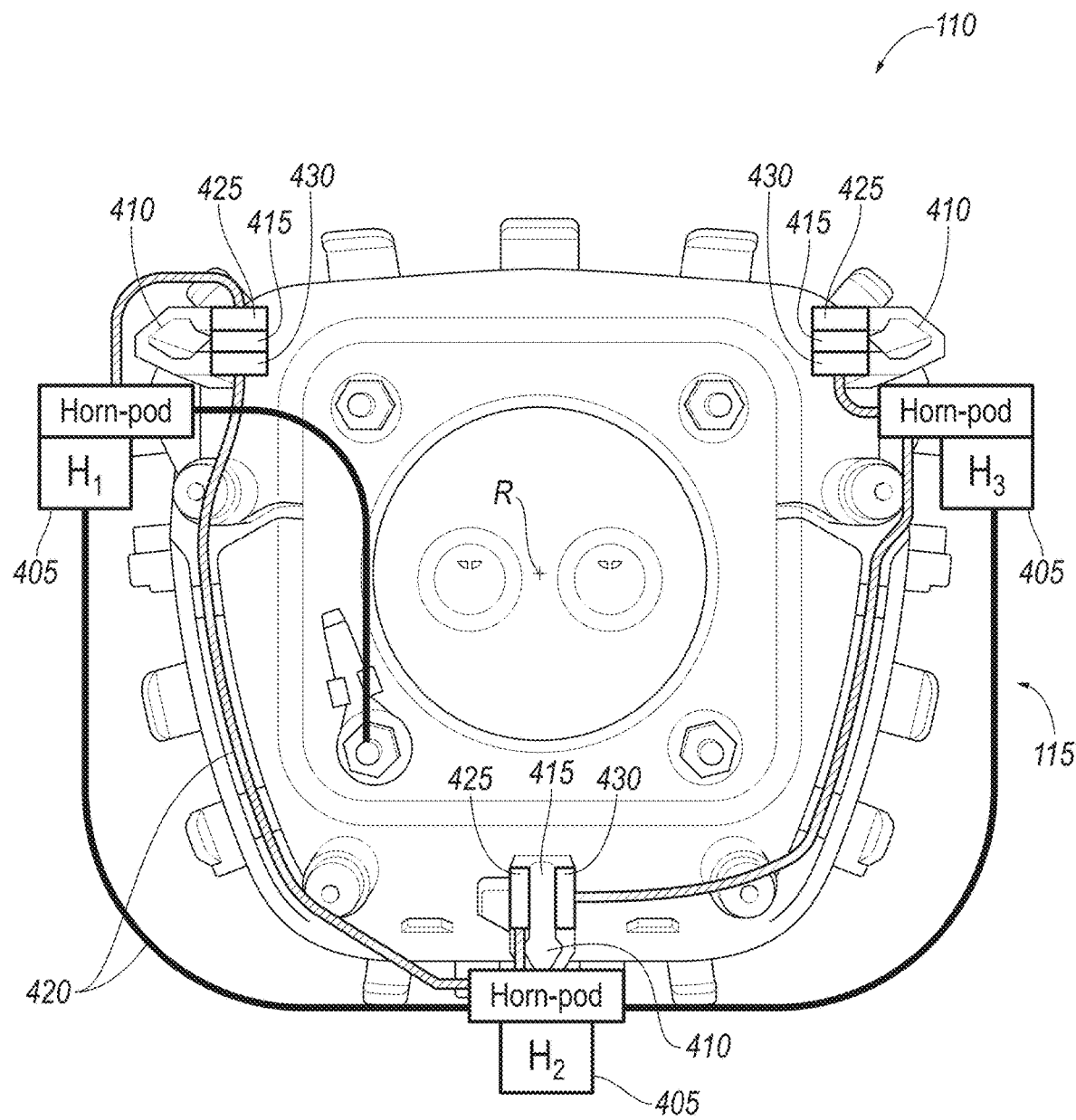
FIG. 4 is a plan view of a steering-wheel base of the steering-wheel assembly.

The springs 325 are positioned to bias the exterior shell 310 away from the steering-wheel base 110 at the respective electrical switches 405 (shown in FIG. 4). For example, the springs 325 may be positioned at the respective pegs 330, with one end attached to the peg 330 and one end fixed relative to the steering-wheel base 110 (e.g., attached to the frame portion 305). Pressing the exterior shell 310 such that one of the pegs 330 pushes the respective electrical switch 405 may move the end of the respective spring 325 connected to the peg 330, thereby putting the spring 325 in a state of compression or tension. Releasing the exterior shell 310 permits the spring 325 to move from the state of compression or tension to a relaxed state (or closer to the relaxed state) by moving the exterior shell 310 away from the steering-wheel base 110.

The airbag assembly 125 includes the hooks 340. The hooks 340 are rigidly connected to the frame portion 305. For example, the hooks 340 may be integral with the frame portion 305. For the purposes of this disclosure, "integral" is defined as made of a single, uniform piece of material with no seams, joints, fasteners, or adhesives holding it together. The hooks 340 are elongated parallel to each other. In other words, each hook 340 defines an axis of elongation L along which the hook 340 is elongated. The axis of elongation L extends along a direction that the hook 340 moves when being installed. The axes of elongation L may be parallel to the axis of rotation R. The shape of the hooks 340 is described in more detail below with respect to FIG. 6. The hooks 340 are arranged to engage with respective ones of the catches 410 (shown in FIG. 4). For example, each hook 340 may be aligned with a respective one of the catches 410 in a plane normal to (i.e., perpendicular to) the axes of elongation L defined by the hooks 340.

With reference to FIG. 4, the steering-wheel base 110 (e.g., the hub 205) includes the catches 410. The catches 410 may be recesses extending into the hub 205. The catches 410 extend into the hub 205 in a vehicle-forward direction parallel to the axes of elongation L defined by the hooks 340 (when the airbag assembly 125 is installed). The catches 410 are shaped to receive and engage with the respective hooks 340, as will be described below with respect to FIG. 7.

The horn electrical circuit 115 extends along the steering-wheel base 110. For example, the horn electrical circuit 115 may include a plurality of wires 420 connecting the electrical components of the horn electrical circuit 115. The wires 420 may be clipped into place on a rear surface of the hub 205 of the steering-wheel base 110 (i.e., on the surface facing toward the airbag assembly 125 when installed). The horn electrical circuit 115 includes the gaps 415 and the electrical switches 405.

The horn electrical circuit 115 includes the gaps 415 across respective ones of the catches 410. Each gap 415 is a disconnection in the horn electrical circuit 115. The horn electrical circuit 115 is an open circuit at the gap 415 unless something electrically bridges the gap 415. As will be described below, one of the hooks 340 fully engaging with the respective catch 410 bridges the respective gap 415, thereby closing the horn electrical circuit 115 at that gap 415. Each gap 415 includes a first wire terminal end 425 and a second wire terminal end 430 spaced from the first wire terminal end 425. The wire 420 leading to the gap 415 on one side ends at the first wire terminal end 425, and the wire 420 leading to that gap 415 on the other side ends at the second wire terminal end 430. Each gap 415 can be closed by an electrical connection from the first wire terminal end 425 to the second wire terminal end 430.

The horn electrical circuit 115 includes at least one electrical switch 405 (e.g., a plurality of electrical switches 405) closable by pressing the exterior shell 310 of the airbag assembly 125 (shown in FIG. 3) toward the steering-wheel base 110. For example, each electrical switch 405 may be positioned underneath a respective one of the pegs 330 (shown in FIG. 3). Each electrical switch 405 may be biased to an open position. When the exterior shell 310 is pressed, one of the pegs 330 pushes on the respective electrical switch 405, thereby switching the electrical switch 405 to a closed position. When the exterior shell 310 is released, the bias of the electrical switch 405 causes the electrical switch 405 to shift back to the open position.

Figure 5:
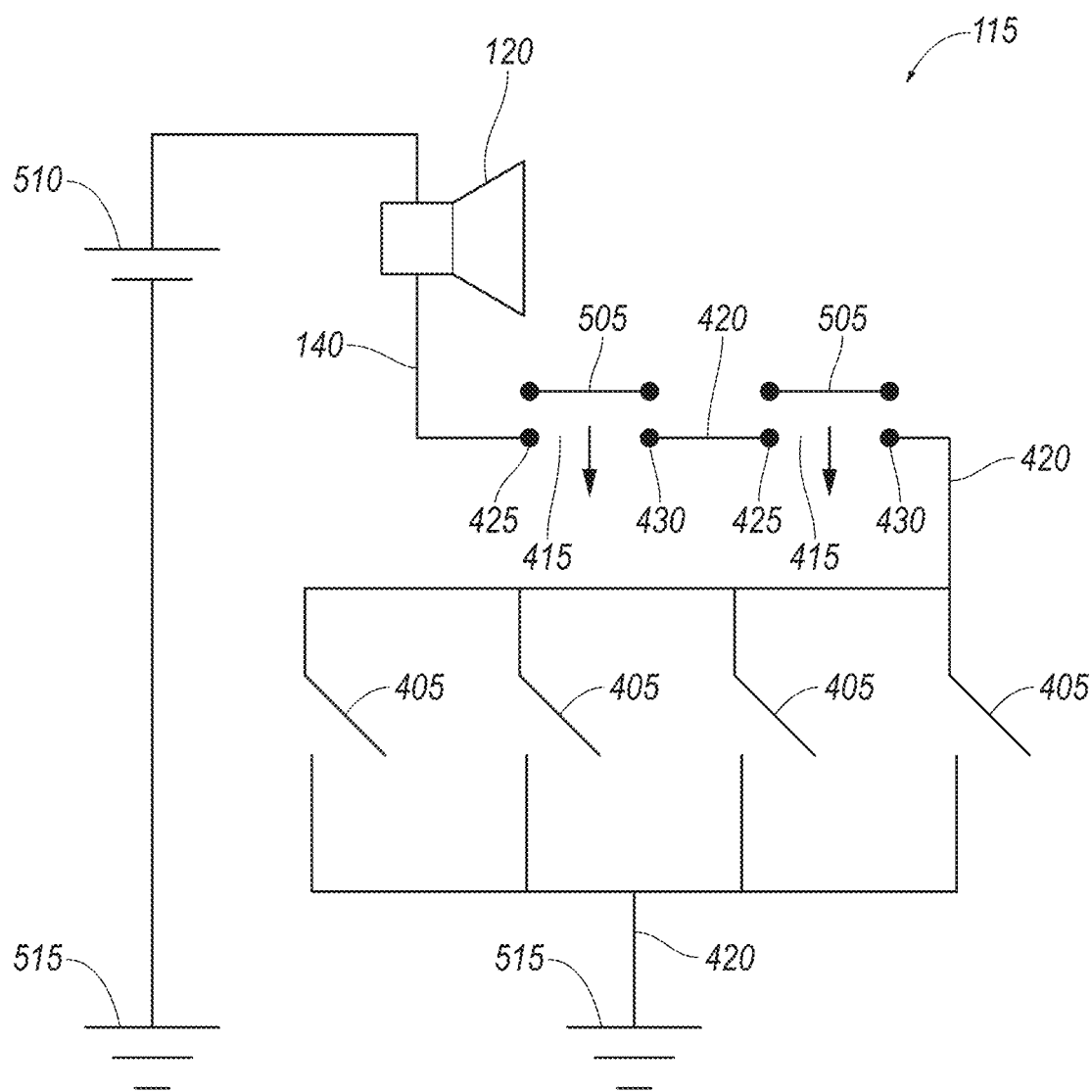
FIG. 5 is a circuit diagram of an example horn electrical circuit of the steering-wheel assembly.

With reference to FIG. 5, the horn electrical circuit 115 is arranged to activate and deactivate the vehicle horn 120. The horn electrical circuit 115 is electrically connected to the vehicle horn 120 and to a battery 510 of the vehicle 100. The battery 510, the vehicle horn 120, and the horn electrical circuit 115 may be electrically arranged in series. The path for current from the battery 510 is through both the vehicle horn 120 and the horn electrical circuit 115 to reach ground 515. Thus, current is able to flow from the battery 510 to the vehicle horn 120 in response to the horn electrical circuit 115 being closed, and current is stopped from flowing from the battery 510 to the vehicle horn 120 in response to the horn electrical circuit 115 being open. The horn electrical circuit 115 is open when at least one of the electrical connectors 505 is not closing the respective gap 415. The horn electrical circuit 115 is closable to activate the vehicle horn 120 (e.g., by pressing the exterior shell 310 to close one of the electrical switches 405) when the electrical connectors 505 close the gaps 415.

The battery 510 may be of any suitable type for vehicular electrification, for example, lithium-ion batteries, nickel-metal hydride batteries, lead-acid batteries, or ultracapacitors, as used in, for example, internal-combustion engine vehicles (ICEs), plug-in hybrid electric vehicles (PHEVs), hybrid electric vehicles (HEVs), or battery electric vehicles (BEVs).

The horn electrical circuit 115 includes the electrical switches 405. The electrical switches 405 are arranged in parallel with each other in the horn electrical circuit 115 (i.e., the ends of each electrical switch 405 are connected to the same two nodes). Thus, when any one of the electrical switches 405 is closed (e.g., by pressing the exterior shell 310, as described above), the horn electrical circuit 115 is closed across all of the electrical switches 405. If the gaps 415 are closed by the electrical connectors 505, then closing any one of the electrical switches 405 closes the horn electrical circuit 115 and activates the vehicle horn 120.

As will be described below, each hook 340 includes a respective electrical connector 505 positioned to close the respective gap 415 when the hook 340 is fully engaged with the respective catch 410 and to leave the respective gap 415 open when the hook 340 is disengaged from the respective catch 410. Each electrical connector 505 closes the respective gap 415 by electrically connecting the first wire terminal end 425 with the second wire terminal end 430.

The gaps 415 are arranged in series with each other in the horn electrical circuit 115. Thus, when any one of the gaps 415 is open (e.g., by the hook 340 not fully engaging the respective catch 410), the horn electrical circuit 115 as a whole is open. When all the gaps 415 are closed (by all the hooks 340 fully engaging the respective catches 410), the horn electrical circuit 115 is closed across the gaps 415, and the horn electrical circuit 115 as a whole may be closed by being closed across the electrical switches 405.

Each electrical switch 405 may be arranged in series with the gaps 415 in the horn electrical circuit 115. The parallel arrangement of the electrical switches 405 may be arranged in series with the gaps 415 in the horn electrical circuit 115. Thus, the horn electrical circuit 115 is closed when at least one of the electrical switches 405 and all the gaps 415 are closed, and the horn electrical circuit 115 is open otherwise. In other words, when all the gaps 415 are closed, the vehicle horn 120 may be activated by closing one of the electrical switches 405. When at least one of the gaps 415 is open, the vehicle horn 120 is not activatable by closing the electrical switches 405.

Figure 6:
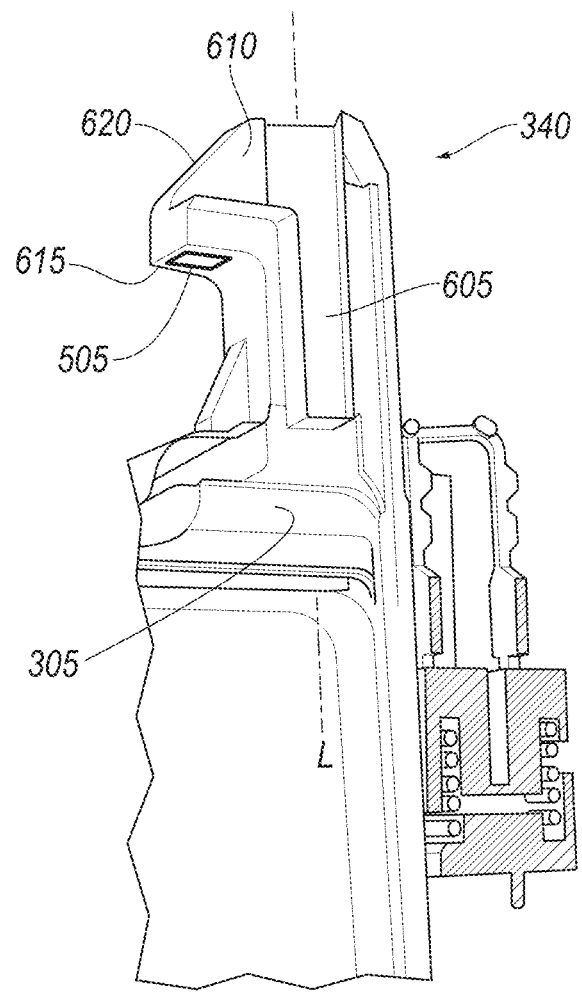
FIG. 6 is a perspective view of a hook of the steering-wheel assembly.

With reference to FIG. 6, each hook 340 includes a body portion 605 and a hooking portion 610. The body portion 605 may be elongated along the respective axis of elongation L. The hooking portion 610 may be positioned at an end of the body portion 605 along the axis of elongation L. The body portion 605 and the hooking portion 610 may be integral.

The hooking portion 610 may be shaped to, once fully engaged on the catch 410, hold the airbag assembly 125 to the frame portion 305. The hooking portion 610 may extend transverse to the axis of elongation L from the body portion 605. Each hook 340 (e.g., each hooking portion 610) may include an underside surface 615 facing toward the frame portion 305 of the airbag assembly 125 along the axis of elongation L. The underside surface 615 may form a right angle or an acute angle with the axis of elongation L in the vehicle-rearward direction, which can serve to hold the hook 340 in place once fully engaged in the catch 410. A top surface 620 of the hooking portion 610 may be sloped from the axis of elongation L toward the frame portion 305, which can serve to bend the hook 340 to slip over the catch 410 during installation.

Each hook 340 includes a respective electrical connector 505 positioned to close the respective gap 415 when the hook 340 is fully engaged with the respective catch 410 and to leave the respective gap 415 open when the hook 340 is disengaged from the respective catch 410. The electrical connectors 505 are positioned on the respective underside surfaces 615 of the respective hooks 340. The electrical connectors 505 may be metal plates each extending across respective exterior surfaces of the respective hooks 340 (e.g., across the respective underside surfaces 615 of the respective hooks 340). For example, the electrical connectors 505 may be embedded in the underside surfaces 615, or the electrical connectors 505 may be overmolded onto the underside surfaces 615. The hooks 340 may be nonconductive on surfaces other than the underside surfaces 615, so that the gaps 415 are not closed other than by the underside surfaces 615 being in place.

Figure 7:
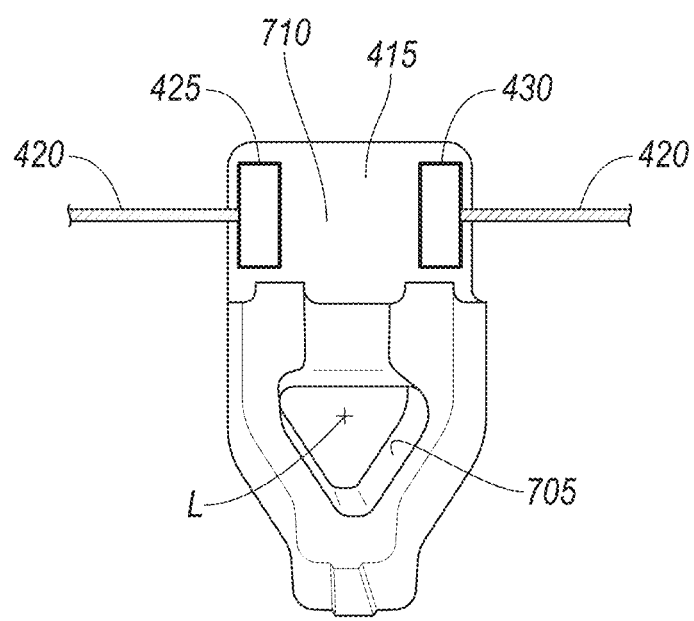
FIG. 7 is a perspective view of a catch of the steering-wheel assembly.
Figure 8:
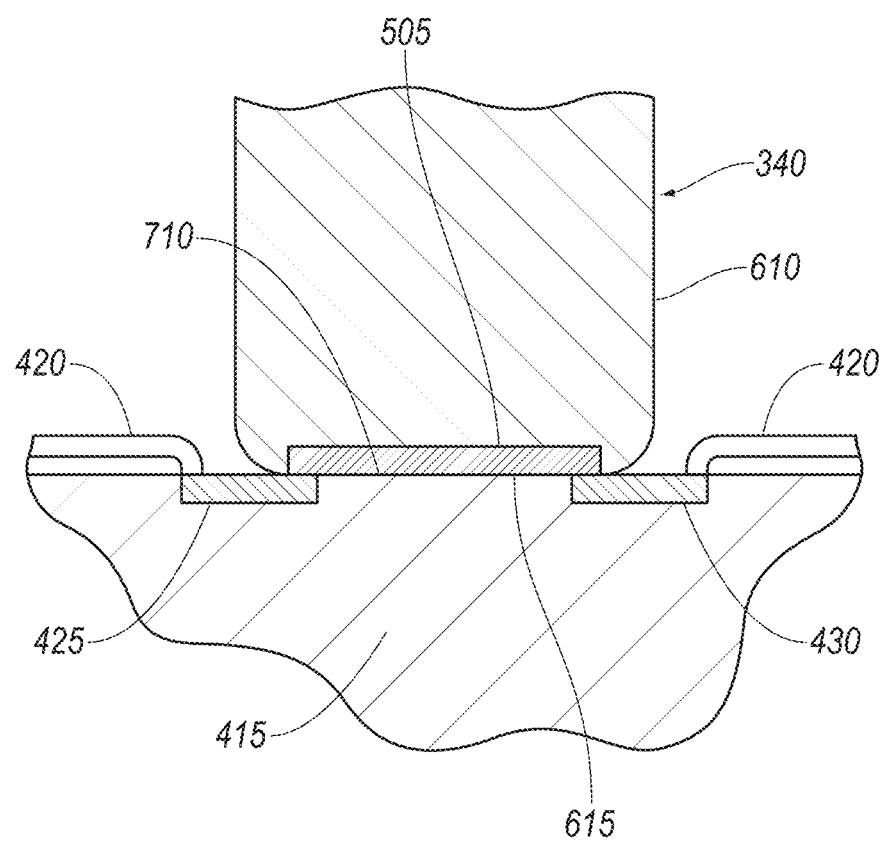
FIG. 8 is a cross-sectional view of the hook fully engaged with the catch.

With reference to FIG. 7, each catch 410 may include a tunnel 705 and a contact surface 710. The tunnel 705 is shaped to permit the hooking portion 610 to pass through during installation. The contact surface 710 extends transverse to the tunnel 705 at a vehicle-forward end of the tunnel 705. The contact surface 710 contacts the respective underside surface 615 when the respective hook 340 is fully engaged (as shown in FIG. 8). The contact surface 710 may be oriented to match the respective underside surface 615 (e.g., at a right angle or acute angle relative to the axis of elongation L in the vehicle-rearward direction), which can hold the hook 340 in place once fully engaged.

The contact surfaces 710 are nonconductive. The gaps 415 in the horn electrical circuit 115 may extend across the respective contact surfaces 710. Each gap 415 includes the first wire terminal end 425 and the second wire terminal end 430 spaced from the first wire terminal end 425. For example, the first wire terminal end 425 and the second wire terminal end 430 may be positioned on opposite sides of the respective contact surface 710. Because the contact surface 710 is nonconductive, the first wire terminal end 425 and the second wire terminal end 430 are not electrically connected unless something conductive is contacting both the first wire terminal end 425 and the second wire terminal end 430.

With reference to FIG. 8, when the hook 340 is fully engaged with the catch 410, the underside surface 615 of the hook 340 contacts the catch 410 (e.g., the contact surface 710 of the catch 410). The electrical connector 505 is positioned to close the gap 415 when the hook 340 is fully engaged with the catch 410. By being positioned on the underside surface 615, the electrical connector 505 contacts the first wire terminal end 425 and the second wire terminal end 430 of the gap 415 on either side of the contact surface 710, thereby electrically bridging the gap 415, when the hook 340 is fully engaged with the catch 410.

The electrical connector 505 is positioned to leave the gap 415 open when the hook 340 is disengaged from the respective catch 410. When the underside surface 615 of the hook 340 is not contacting the contact surface 710, the electrical connector 505 on the underside surface 615 is spaced from the first wire terminal end 425 and/or the second wire terminal end 430. For example, when the hooking portion 610 and therefore the underside surface 615 is still in the tunnel 705 and has not yet moved over the contact surface 710, the electrical connector 505 is not contacting the first wire terminal end 425 or the second wire terminal end 430, and the gap 415 is open.

Figure 9:
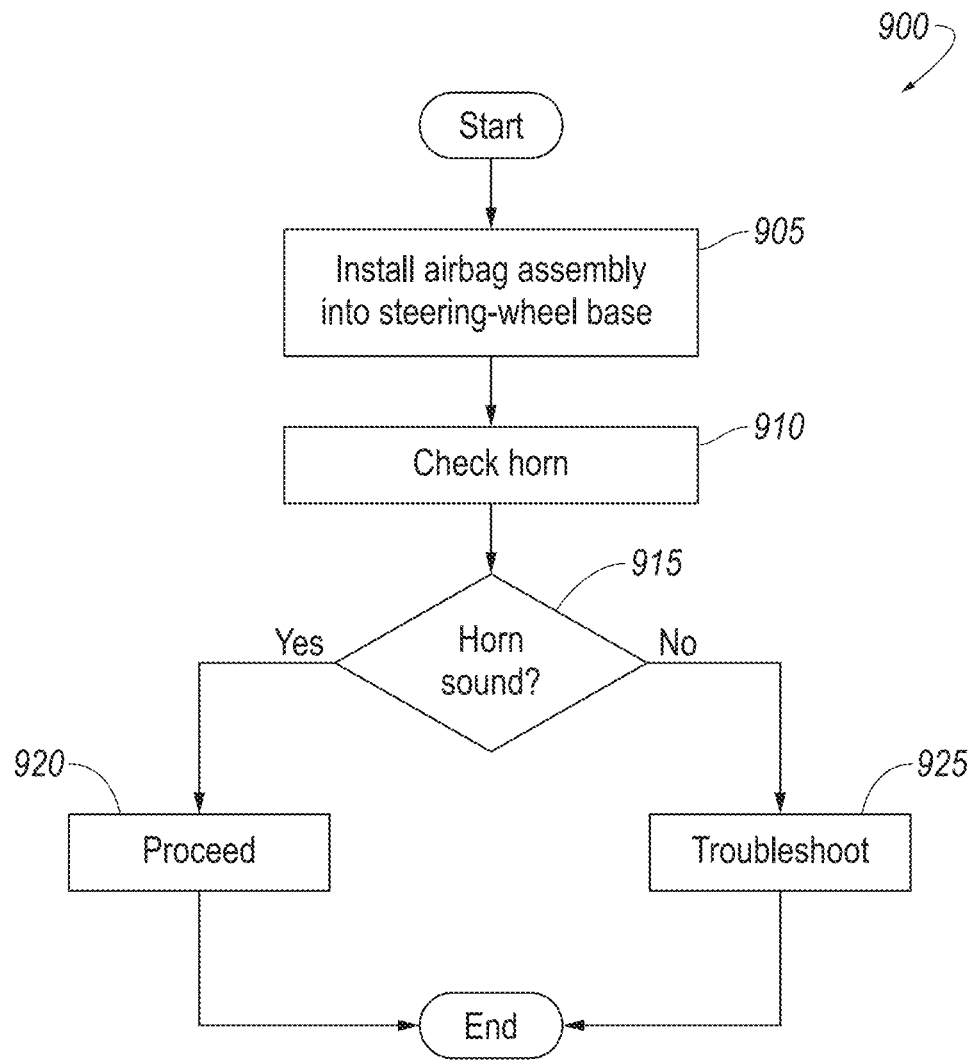
FIG. 9 is a flowchart of an example process for assembling the steering-wheel assembly.

FIG. 9 is a flowchart illustrating an example process 900 for assembling the steering-wheel assembly 105. The process 900 may be performed by one or more technicians in a manufacturing plant, for example. The steps of the process 900 may be performed by the same technician or different technicians. As a general overview of the process 900, a technician installs the airbag assembly 125 onto the steering-wheel base 110, and a technician attempts to activate the vehicle horn 120. In response to the vehicle horn 120 emitting a sound, a technician proceeds to a next step of the assembly. In response to the vehicle horn 120 not emitting a sound, a technician troubleshoots a cause of the vehicle horn 120 not emitting a sound.

The process 900 begins in a block 905, in which a technician installs the airbag assembly 125 onto the steering-wheel base 110. The technician aligns the hooks 340 with the respective catches 410 and presses the airbag assembly 125 toward the steering-wheel base 110 in a vehicle-forward direction along the axes of elongation L of the hooks 340 until the technician believes that the hooks 340 are fully engaged with the respective catches 410.

Next, in a block 910, a technician presses on the airbag assembly 125 to activate the vehicle horn 120 and listens for the sound of the vehicle horn 120.

Next, in a decision block 915, the technician determines whether the vehicle horn 120 emitted a sound in the block 910. In response to the vehicle horn 120 emitting a sound, the process 900 proceeds to a block 920. In response to the vehicle horn 120 not emitting a sound, the process 900 proceeds to a block 925.

In the block 920, a technician moves the steering-wheel assembly 105 to a next step in the assembly. For example, the vehicle 100 may move to a next station in an assembly line. After the block 920, the process 900 ends.

In the block 925, a technician determines a cause of the vehicle horn 120 not emitting a sound. The technician may perform a visual inspection of whether each hook 340 is fully engaged with each catch 410. The technician may re-attempt to engaged each hook 340 with the respective catch 410 and attempt to activate the vehicle horn 120 again. The technician may remove the airbag assembly 125 and inspect the horn electrical circuit 115. The technician may check the wiring 140 to the vehicle horn 120 and the vehicle horn 120 itself. After the block 925, the process 900 ends.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Terms such as "front," "forward," "longitudinal," "back," "rearward," "left," "right," "lateral," "upward," "downward," "vertical," etc., are understood relative to the vehicle 100. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A steering-wheel assembly comprising:
   a steering-wheel base including a plurality of catches;
   a horn electrical circuit extending along the steering-wheel base and electrically connected to a vehicle horn; and
   an airbag assembly including a plurality of hooks arranged to engage with respective ones of the catches;
   the horn electrical circuit including a plurality of gaps across the respective ones of the catches;
   each hook including an electrical connector positioned to close the respective gap when the hook is fully engaged with the respective catch and to leave the respective gap open when the hook is disengaged from the respective catch;
   the horn electrical circuit being closable to activate the vehicle horn when the electrical connectors close the gaps; and
   the horn electrical circuit being open when at least one of the electrical connectors is not closing the respective gap.

2. The steering-wheel assembly of claim 1, wherein the electrical connectors are metal plates each extending across respective exterior surfaces of the respective hooks.

3. The steering-wheel assembly of claim 2, wherein:
   each hook includes an underside surface facing toward a frame portion of the airbag assembly;
   the underside surfaces contact the respective catches when the respective hooks are fully engaged; and
   the electrical connectors are positioned on the respective underside surfaces.

4. The steering-wheel assembly of claim 3, wherein:
   each catch includes a contact surface that contacts the respective underside surface when the respective hook is fully engaged; and
   the contact surfaces are nonconductive.

5. The steering-wheel assembly of claim 1, wherein the gaps are arranged in series with each other in the horn electrical circuit.

6. The steering-wheel assembly of claim 1, wherein:
   each gap includes a first wire terminal end and a second wire terminal end spaced from the first wire terminal end; and
   the respective electrical connector contacts the first wire terminal end and the second wire terminal end of the respective gap when the respective hook is fully engaged.

7. The steering-wheel assembly of claim 1, wherein the horn electrical circuit includes an electrical switch closable by pressing an exterior shell of the airbag assembly toward the steering-wheel base.

8. The steering-wheel assembly of claim 7, further comprising a spring biasing the exterior shell of the airbag assembly away from the steering-wheel base at the electrical switch.

9. The steering-wheel assembly of claim 7, wherein the airbag assembly includes a frame portion and the exterior shell, and the hooks are rigidly connected to the frame portion.

10. The steering-wheel assembly of claim 7, wherein the electrical switch is arranged in series with the gaps in the horn electrical circuit.

11. The steering-wheel assembly of claim 7, wherein the horn electrical circuit includes a plurality of electrical switches including the electrical switch, each electrical switch closable by pressing the exterior shell toward the steering-wheel base.

12. The steering-wheel assembly of claim 11, wherein the electrical switches are arranged in parallel with each other in the horn electrical circuit.

13. The steering-wheel assembly of claim 12, wherein the parallel arrangement of the electrical switches is arranged in series with the gaps in the horn electrical circuit.

14. The steering-wheel assembly of claim 1, wherein the hooks are elongated parallel to each other.

15. The steering-wheel assembly of claim 14, wherein:
   the hooks define respective axes of elongation;
   each hook includes an underside surface facing toward a frame portion of the airbag assembly along the respective axis of elongation; and
   the underside surfaces contact the respective catches when the respective hooks are fully engaged.

16. The steering-wheel assembly of claim 15, wherein the electrical connectors are positioned on the respective underside surfaces.

17. The steering-wheel assembly of claim 1, wherein the airbag assembly includes an airbag cushion and an inflator positioned to inflate the airbag cushion.

* * * * *